UNITED STATES PATENT OFFICE.

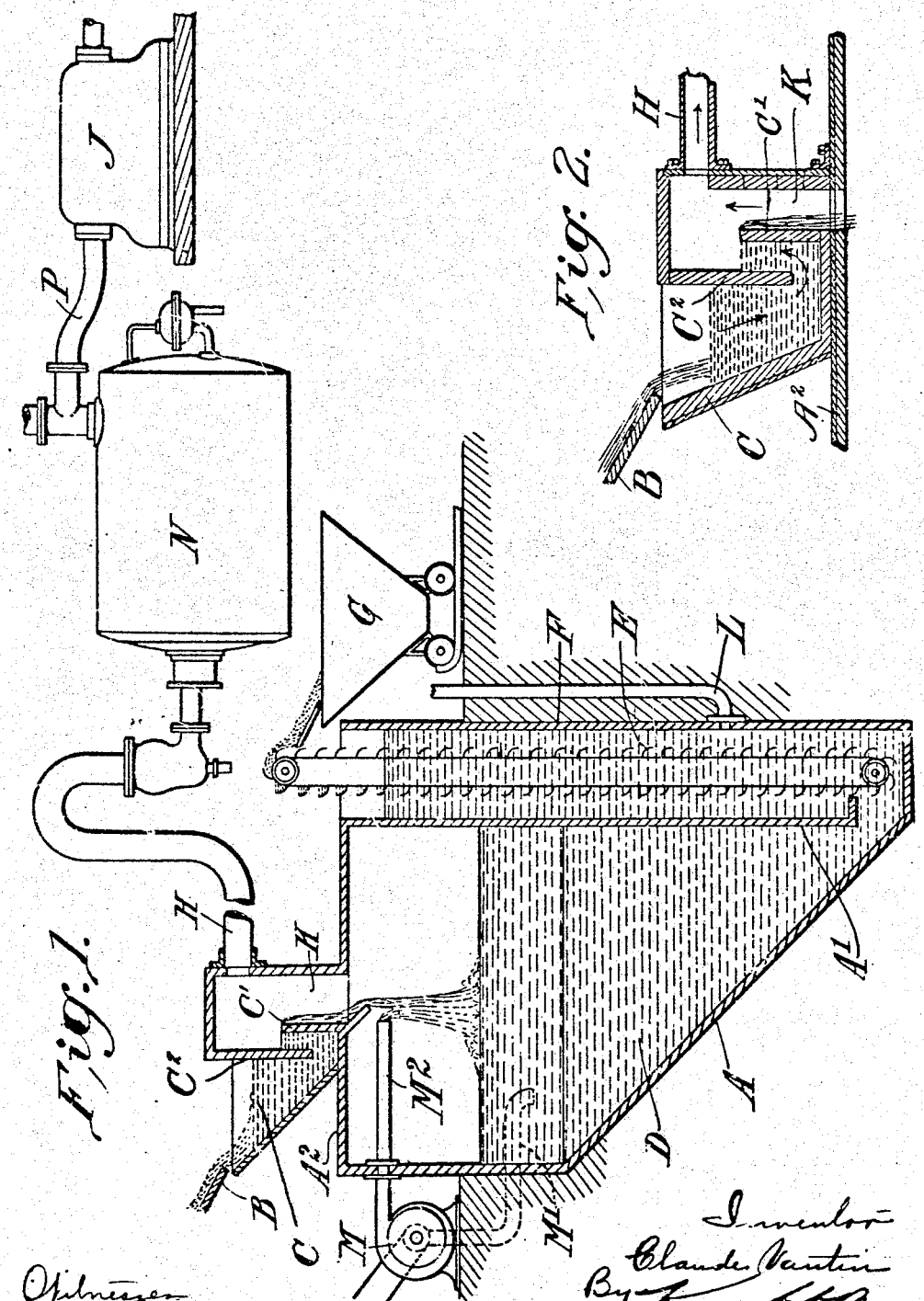

CLAUDE VAUTIN, OF LONDON, ENGLAND.

UTILIZATION OF HEAT CONTAINED IN SLAGS.

972,418.  Specification of Letters Patent.  Patented Oct. 11, 1910.

Application filed June 26, 1909.  Serial No. 504,601.

*To all whom it may concern:*

Be it known that I, CLAUDE VAUTIN, a subject of the King of England, residing at London, England, have invented certain new and useful Improvements in the Utilization of Heat Contained in Slags, of which the following is a specification.

This invention relates to improvements in the utilization of the heat contained in the slags or scoria produced in the smelting and reduction of iron and copper ores and the like.

According to this invention molten slag is brought into water contained in a closed vessel and the slag is thus chilled or granulated and then removed from the vessel, the low pressure steam produced being led either to a low pressure steam engine of the turbine type such as a Rateau or Parsons low pressure turbine or into a heat accumulator such as the Rateau heat accumulator which is connected with an engine and condenser.

The steam generator or boiler used in this invention is provided with a suitable trapped inlet through which the molten slag is admitted, the said trapped inlet being placed at the top or side of the boiler as may be more convenient; also with means for removing the granulated slag, and means of connecting it with the steam motor.

In the accompanying drawings which illustrate by way of example one method of carrying this invention into effect, Figure 1 is a diagram of the apparatus in vertical section, and Fig. 2 is a vertical section of the slag inlet and steam outlet on a larger scale.

Like letters indicate like parts throughout the drawings.

The steam generator consists of a large chamber A lined with non-conducting brick unaffected by the contents and set in the ground so that the top of the chamber is substantially at the same level as the source B from which the slag is supplied (the slag outlet from furnaces for example). Conveniently the generator has a vertical wall A' and three sloping walls so that the generator comes to a point at the bottom. The generator is covered by a roof A².

The inlet for molten slag from the supply channel B to the generator A comprises a reservoir C with an inner wall C' over which the slag flows into the generator A and a partition C² so arranged that the slag has to flow underneath the partition, the level of the slag being above the partition on each side, thus forming a liquid seal for the inlet at all times so that if the pressure of the steam in the generator rises above the atmospheric pressure, the slag will not be blown out at the inlet. The difference of level of the slag on the two sides of the partition allows for a slightly superatmospheric pressure in the generator and the trap also entirely prevents the admission of air to the generator.

The granulation of slag in water is already known and in the present system the slag is run into the water D in such a way that it becomes granulated and sinks to the bottom of the chamber A. The slag is preferably removed continuously by an elevator E such as a screw conveyer or bucket elevator and as the pressure in the generator is about atmospheric pressure this is practicable. In order to prevent escape of steam and to prevent admission of air from the buckets into the generator, the slag elevator or conveyer E is inclosed in a casing F which extends below the surface of the water, and thus the only steam lost will be that generated in the casing F. Preferably this casing forms a separate vertical chamber so that any air carried down by the buckets will rise vertically in the chamber F when it escapes and will not pass into the generator proper. The cooled slag is discharged into trucks G or is otherwise removed.

Steam is generated in large quantities substantially at atmospheric pressure and is led through a suitable outlet pipe H from the top of the generator into the steam motor J. The Parsons, Rateau and other low pressure steam turbines (with or without the use of the Rateau or the like regenerating accumulator) work effectively with steam at atmospheric pressure and this invention consists in the use of such motors in combination with the steam generator above described. When such a motor is employed, the steam is preferably conducted through the pipe H to an accumulator N and thence through a pipe P to the motor J. The accumulator is of a well-known type and is, therefore, not described in detail.

The outlet K for the steam from the boiler is arranged so that the steam in passing out of the boiler comes in contact with the inflowing stream of molten slag in or about the trapped inlet whereby the steam is heated and dried. In order to utilize to some extent the heat contained in the conveyer chamber F, the feed water inlet L preferably leads into that chamber.

It is obvious that the charge of molten slag could be added or admitted to the boiler by intermittent charges, in which case the use of the intervening heat accumulator would be of particular advantage as the supply of steam would not be constant. It is also obvious that the chilled or granulated slag could be removed from the boiler intermittently.

In large copper and iron smelting works where there are several furnaces in operation it may be of advantage for the slag either to flow directly or to be conveyed by means of slag wagons, to one or more furnaces of the reverberatory type, to act as a storage system for the molten slag, and thus permit an even and continuous flow of slag into the boiler or boilers. In the case of copper smelting works this arrangement also acts as a "settler" and permits the recovery of suspended matte, as will be understood by those skilled in the art of copper smelting. The quantity of fuel necessary to maintain the slag at its normal temperature such as that at which it leaves the furnace would be comparatively small, in consequence of the high initial temperature at which the slag entered the storage furnace.

In many instances the slags would be run by means of launders direct to the boiler; circumstances deciding the most practical course to follow.

In order to effectively granulate the slag, the stream of slag upon its entry into the generator is preferably struck by a stream of hot water at a considerable velocity. If cold water were used condensation of the steam might occur and for this reason it is preferable to employ a pump M which draws hot water through a pipe M' from the generator and directs it through the pipe M² at a considerable velocity against the stream of molten slag.

What I claim as my invention and desire to secure by Letters Patent is:—

1. In an apparatus for generating and supplying steam produced by the heat contained in slag, the combination of a substantially closed steam generator containing water, a trapped inlet for slag thereto, means for removing the slag continuously from the generator and a steam conduit leading from the generator.

2. In an apparatus for supplying to a low pressure turbine steam generated by the heat contained in slag, the combination of a substantially closed steam generator containing water, a trapped inlet for slag thereto, means for removing the slag continuously from the generator and a steam conduit leading from the generator.

3. In an apparatus for generating and supplying steam produced by the heat contained in slag, the combination of a substantially closed steam generator containing water, an inlet having a liquid seal for admitting slag thereto, and means for continuously lifting and removing the slag from the generator.

4. In an apparatus for generating and supplying steam produced by the heat contained in slag, the combination of a substantially closed steam generator containing water, having a slag inlet comprising a reservoir with an inner wall over which the slag flows into the generator, and a partition under which the slag must pass so as to prevent the admission of air and to allow for any super-atmospheric pressure in the generator, and means for removing the slag continuously from the generator.

5. In an apparatus for generating and supplying steam produced by the heat contained in slag, the combination of a substantially closed steam generator containing water, a trapped inlet for slag thereto, a continuous slag elevator extending upward from the bottom of the generator, a casing inclosing the elevator and extending below the surface of the water.

6. In an apparatus for generating and supplying steam produced by the heat contained in slag, the combination of a substantially closed steam generator containing water, a trapped inlet for slag thereto, a bucket conveyer E extending upward from the bottom of the generator, and a casing F inclosing the conveyer and forming a separate vertical chamber.

7. In an apparatus for generating and supplying steam produced by the heat contained in slag, the combination of a substantially closed steam generator containing water, a trapped inlet for slag thereto, an outlet for steam from the generator adjacent to the said inlet and arranged to bring the steam in contact with the inflowing stream of molten slag, and means for removing the slag continuously from the generator.

8. In an apparatus for generating and supplying steam produced by the heat contained in slag, the combination of a substantially closed steam generator containing water, a trapped inlet for slag thereto, means for removing the slag continuously from the generator, a pump arranged to draw hot water from the generator and a nozzle connected to the pump and arranged to direct the hot water on to the incoming stream of molten slag.

9. In an apparatus for generating and supplying steam produced by the heat contained in slag, the combination with a steam generator, and a trapped inlet for the admission of slag thereto, of a steam outlet adjacent to the slag inlet, whereby the steam is brought into contact with and thoroughly dried by the molten slag.

In testimony whereof I have signed my name to this specification in the presence of two subscribing witnesses.

CLAUDE VAUTIN.

Witnesses:
H. E. FRANCK,
PERCY HEWITT.